(12) United States Patent
Guerra et al.

(10) Patent No.: US 7,024,364 B2
(45) Date of Patent: Apr. 4, 2006

(54) SYSTEM, METHOD AND COMPUTER PROGRAM PRODUCT FOR LOOKING UP BUSINESS ADDRESSES AND DIRECTIONS BASED ON A VOICE DIAL-UP SESSION

(75) Inventors: Lisa M. Guerra, Los Altos, CA (US); Mikael Berner, San Jose, CA (US); Kevin Stone, Sunnyvale, CA (US); Amol Joshi, San Jose, CA (US); Steve Tran, Palo Alto, CA (US)

(73) Assignee: BeVocal, Inc., Sunnyvale, CA (US)

( * ) Notice: Subject to any disclaimer, the term of this patent is extended or adjusted under 35 U.S.C. 154(b) by 152 days.

(21) Appl. No.: 09/802,493

(22) Filed: Mar. 9, 2001

(65) Prior Publication Data

US 2002/0169611 A1    Nov. 14, 2002

(51) Int. Cl.
  *G10L 21/00* (2006.01)
(52) U.S. Cl. .................................... 704/270
(58) Field of Classification Search ............... 704/270, 704/275, 273; 379/67.1, 88.01, 88.02, 88.03, 379/88.04, 88.13, 88.16, 88.17, 88.19, 88.22
  See application file for complete search history.

(56) References Cited

U.S. PATENT DOCUMENTS

| | | | |
|---|---|---|---|
| 6,317,718 B1 * | 11/2001 | Fano | 705/1 |
| 6,401,085 B1 * | 6/2002 | Gershman et al. | 707/4 |
| 6,446,076 B1 * | 9/2002 | Burkey et al. | 707/102 |
| 6,456,854 B1 * | 9/2002 | Chern et al. | 455/457 |
| 6,501,832 B1 * | 12/2002 | Saylor et al. | 379/88.04 |
| 6,522,875 B1 * | 2/2003 | Dowling et al. | 455/414.3 |
| 6,535,743 B1 * | 3/2003 | Kennedy et al. | 455/456.1 |
| 6,658,389 B1 * | 12/2003 | Alpdemir | 704/275 |
| 6,773,344 B1 * | 8/2004 | Gabai et al. | 463/1 |
| 6,792,086 B1 * | 9/2004 | Saylor et al. | 379/88.17 |
| 6,812,851 B1 * | 11/2004 | Dukach et al. | 340/815.4 |
| 6,888,929 B1 * | 5/2005 | Saylor et al. | 379/88.16 |
| 6,895,084 B1 * | 5/2005 | Saylor et al. | 379/88.22 |
| 6,907,111 B1 * | 6/2005 | Zhang et al. | 379/88.02 |

* cited by examiner

*Primary Examiner*—Susan McFadden
(74) *Attorney, Agent, or Firm*—Zilka-Kotab, PC

(57) ABSTRACT

A system, method and computer program product for determining an address of an entity based on a user location are disclosed. An utterance representative of an entity is initially received from a user. The entity associated with the utterance is then recognized using a speech recognition process. Next, a location of the user is determined. A query is performed to identify a plurality of locations associated with the entity. Based on the results of the query and the location of the user, it is ascertained which of the identified locations associated with the entity are in proximity to the location of the user.

18 Claims, 17 Drawing Sheets

SYSTEM, METHOD AND COMPUTER PROGRAM PRODUCT FOR LOOKING UP BUSINESS ADDRESSES AND DIRECTIONS BASED ON A VOICE DIAL-UP SESSION

FIELD OF THE INVENTION

This invention relates to speech recognition systems, and more particularly, relates to large-scale speech recognition systems.

BACKGROUND OF THE INVENTION

Automatic speech recognition (ASK) systems provide means for human beings to interface with communication equipment, computers and other machines in a mode of communication which is most natural and convenient to humans. One known approach to automatic speech recognition of isolated words involves the following: periodically sampling a bandpass filtered (BPF) audio speech input signal; monitoring the sampled signals for power level to determine the beginning and the termination (endpoints) of the isolated words; creating from the sampled signals frames of data and then processing the data to convert them to processed frames of parametric values which are more suitable for speech processing; storing a plurality of templates (each template is a plurality of previously created processed frames of parametric values representing a word, which when taken together form the reference vocabulary of the automatic speech recognizer); and comparing the processed frames of speech with the templates in accordance with a predetermined algorithm to find the best time alignment path or match between a given template and the spoken word.

ASR techniques commonly use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

ASR systems have greatly improved in recent years as better algorithms and acoustic models are developed, and as more computer power can be brought to bear on the task. An ASR system running on an inexpensive home or office computer with a good microphone can take free-form dictation, as long as it has been pre-trained for the speaker's voice. Over the phone, and with no speaker training, a speech recognition system needs to be given a set of speech grammars that tell it what words and phrases it should expect. With these constraints a surprisingly large set possible utterances can be recognized (e.g., a particular mutual fund name out of thousands). Recognition over mobile phones in noisy environments does require more tightly pruned and carefully crafted speech grammars, however. Today there are many commercial uses of ASR in dozens of languages, and in areas as disparate as voice portals, finance, banking, telecommunications, and brokerages.

Advances are also being made in speech synthesis, or text-to-speech (TTS). Many TTS systems still sound like "robots" and can be hard to listen to or even at times incomprehensible. However, waveform concatenation speech synthesis is frequently deployed where speech is not completely generated from scratch, but is assembled from libraries of pre-recorded waveforms.

In a standard speech recognition/synthesis system, a database of utterances is maintained for administering a predetermined service. In one example of operation, a user may utilize a telecommunication network to communicate utterances to the system. In response to such communication, the utterances are recognized utilizing speech recognition, and processing takes place utilizing the recognized utterances. Thereafter, synthesized speech is outputted in accordance with the processing. In one particular application, a user may verbally communicate a street address to the speech recognition system, and driving directions may be returned utilizing synthesized speech.

SUMMARY OF THE INVENTION

A system, method and computer program product for determining an address of an entity based on a user location are disclosed. An utterance representative of an entity is initially received from a user. The entity associated with the utterance is then recognized using a speech recognition process. Next, a location associated with the user is determined. A query is performed to identify a plurality of locations associated with the entity. Based on the results of the query and the location of the user, it is ascertained which of the locations associated with the entity are in proximity to the location of the user.

In an embodiment of the present invention, the user may then informed about the locations associated with the entity ascertained to be in proximity to the location of the user. In such an embodiment, the user may be audibly informed via a speech recognition portal about the locations associated with the entity ascertained to be in proximity to the location of the user. As another option, the user may be informed via an electronic message transmitted utilizing a network about the locations associated with the entity ascertained to be in proximity to the location of the user.

In one aspect of the present invention, the location of the user may be the current location of the user. In another aspect, the utterances representative of the entity may include utterances representative of criteria of the user so that the locations associated with the entity ascertained to be in proximity to the location of the user satisfy the criteria of the user. In such an aspect, the criteria of the user may include at least one of: a location associated with the entity currently holding a sale and a currently open location associated with the entity.

In an embodiment of the present invention directions from the location of the user to at least one of the locations associated with the entity ascertained to be in proximity to the location of the user may be generated and delivered to the user. In such an embodiment, the user may be permitted to select which of the locations associated with the user (e.g., work, home, street address) that the user wishes to receive directions from. In another embodiment, communication may be facilitated between the user and at least one of the locations associated with the entity ascertained to be closest to the location of the user. In a further embodiment, promotions may be offered to the user. In such an embodiment, the promotions offered to the user may be associated with one or more entities determined to be proximal to the location of the user.

In one embodiment, it may also be determined which of the identified locations is closed to the location associated with the user. In a further embodiment, a ranking may be performed on the identified locations of the ascertained to be in proximity to the location associated with the user to rank the identified locations from closest to furthest from the location associated with the user.

DETAILED DESCRIPTION

Figure 1:
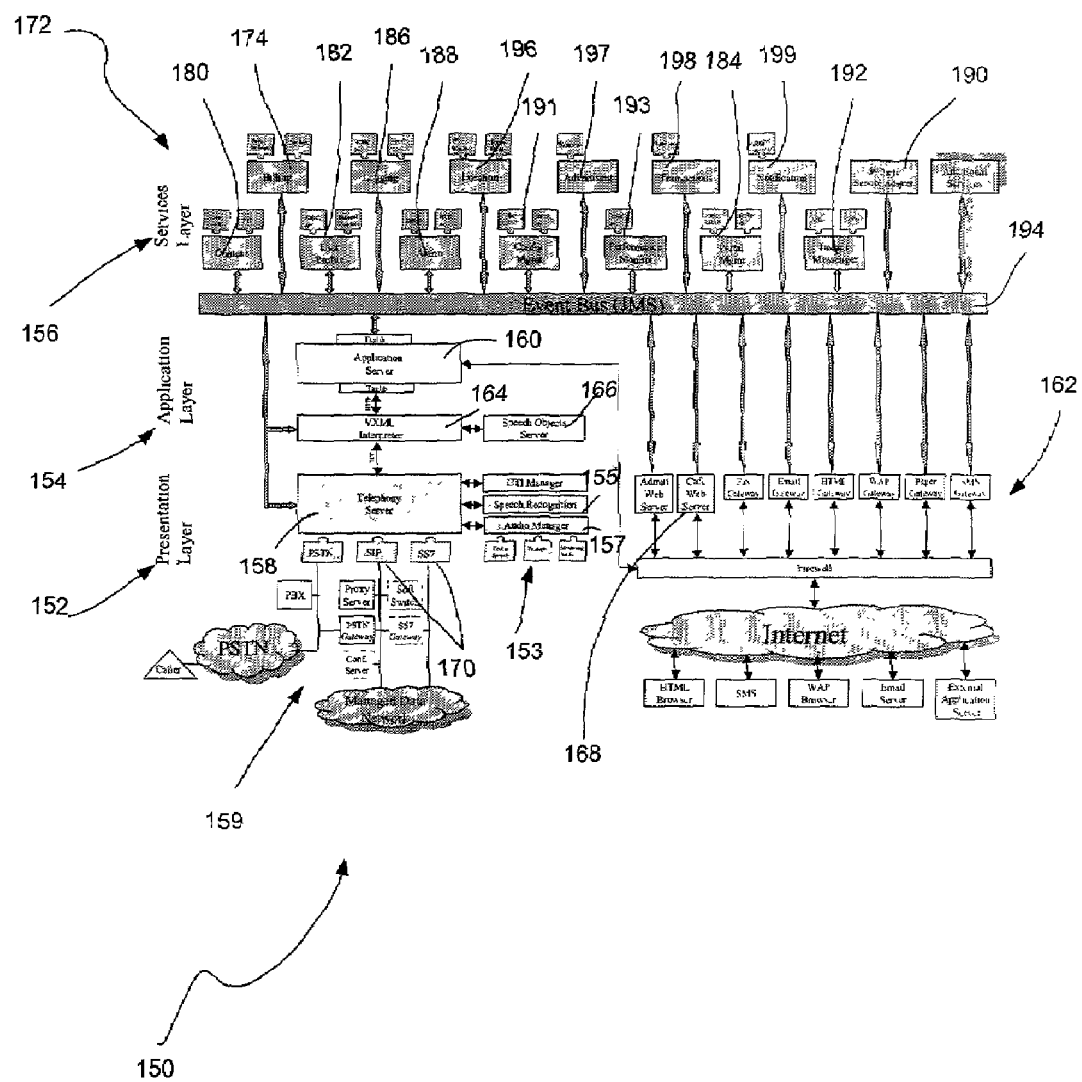
FIG. 1 illustrates one exemplary platform on which an embodiment of the present invention may be implemented.

FIG. 1 illustrates an exemplary platform 150 on which the present invention may be implemented. The present platform 150 is capable of supporting voice applications that provide unique business services. Such voice applications may be adapted for consumer services or internal applications for employee productivity.

The present platform of FIG. 1 provides an end-to-end solution that manages a presentation layer 152, application logic 154, information access services 156, and telecom infrastructure 159. With the instant platform, customers can build complex voice applications through a suite of customized applications and a rich development tool set on an application server 160. The present platform 150 is capable of deploying applications in a reliable, scalable manner, and maintaining the entire system through monitoring tools.

The present platform 150 is multi-modal in that it facilitates information delivery via multiple mechanisms 162, i.e. Voice, Wireless Application Protocol (WAP), Hypertext Mark-up Language (HTML), Facsimile, Electronic Mail, Pager, and Short Message Service (SMS). It further includes a VoiceXML interpreter 164 that is fully compliant with the VoiceXML 1.0 specification, written entirely in Java®, and supports Nuance® SpeechObjects 166.

Yet another feature of the present platform 150 is its modular architecture, enabling "plug-and-play" capabilities. Still yet, the instant platform 150 is extensible in that developers can create their own custom services to extend the platform 150. For further versatility, Java® based components are supported that enable rapid development, reliability, and portability. Another web server 168 supports a web-based development environment that provides a comprehensive set of tools and resources which developers may need to create their own innovative speech applications. Support for SIP and SS7 (Signaling System 7) is also provided. Backend Services 172 are also included that provide value added functionality such as content management 180 and user profile management 182. Still yet, there is support for external billing engines 174 and integration of leading edge technologies from Nuance®, Oracle®, Cisco®, Natural Microsystems®, and Sun Microsystems®.

More information will now be set forth regarding the application layer 154, presentation layer 152, and services layer 156.

Application Layer (154)

The application layer 154 provides a set of reusable application components as well as the software engine for their execution. Through this layer, applications benefit from a reliable, scalable, and high performing operating environment. The application server 160 automatically handles lower level details such as system management, communications, monitoring, scheduling, logging, and load balancing. Some optional features associated with each of the various components of the application layer 154 will now be set forth.

Application Server (160)

A high performance web/JSP server that hosts the business and presentation logic of applications.

High performance, load balanced, with fail over.

Contains reusable application components and ready to use applications.

Hosts Java Servlets and JSP's for custom applications.

Provides easy to use taglib access to platform services.

VXML Interpreter (164)

Executes VXML applications

VXML 1.0 compliant

Can execute applications hosted on either side of the firewall.

Extensions for easy access to system services such as billing.

Extensible—allows installation of custom VXML tag libraries and speech objects.

Provides access to SpeechObjects 166 from VXML.

Integrated with debugging and monitoring tools.

Written in Java®.

Speech Objects Server (166)
  Hosts SpeechObjects based components.
  Provides a platform for running SpeechObjects based applications.
  Contains a rich library of reusable SpeechObjects.

Services Layer (156)
  The services layer 156 simplifies the development of voice applications by providing access to modular value-added services. These backend modules deliver a complete set of functionality, and handle low level processing such as error checking. Examples of services include the content 180, user profile 182, billing 174, and portal management 184 services. By this design, developers can create high performing, enterprise applications without complex programming. Some optional features associated with each of the various components of the services layer 156 will now be set forth.

Content (180)
  Manages content feeds and databases such as weather reports, stock quotes, and sports.
  Ensures content is received and processed appropriately.
  Provides content only upon authenticated request.
  Communicates with logging service 186 to track content usage for auditing purposes.
  Supports multiple, redundant content feeds with automatic fail over.
  Sends alarms through alarm service 188.

User Profile (182)
  Manages user database
  Can connect to a 3$^{rd}$ party user database 190. For example, if a customer wants to leverage his/her own user database, this service will manage the connection to the external user database.
  Provides user information upon authenticated request.

Alarm (188)
  Provides a simple, uniform way for system components to report a wide variety of alarms.
  Allows for notification (Simply Network Management Protocol (SNMP), telephone, electronic mail, pager, facsimile, SMS, WAP push, etc.) based on alarm conditions.
  Allows for alarm management (assignment, status tracking, etc) and integration with trouble ticketing and/or helpdesk systems.
  Allows for integration of alarms into customer premise environments.

Configuration Management (191)
  Maintains the configuration of the entire system.

Performance Monitor (193)

Provides real time monitoring of entire system such as number of simultaneous users per customer, number of users in a given application, and the uptime of the system.
  Enables customers to determine performance of system at any instance.

Portal Management (184)
  The portal management service 184 maintains information on the configuration of each voice portal and enables customers to electronically administer their voice portal through the administration web site.
  Portals can be highly customized by choosing from multiple applications and voices. For example, a customer can configure different packages of applications i.e. a basic package consisting of 3 applications for $4.95, a deluxe package consisting of 10 applications for $9.95, and premium package consisting of any 20 applications for $14.95.

Instant Messenger (192)
  Detects when users are "on-line" and can pass messages such as new voicemails and e-mails to these users.

Billing (174)
  Provides billing infrastructure such as capturing and processing billable events, rating, and interfaces to external billing systems.

Logging (186)
  Logs all events sent over the JMS bus 194. Examples include User A of Company ABC accessed Stock Quotes, application server 160 requested driving directions from content service 180, etc.

Location (196)
  Provides geographic location of caller.
  Location service sends a request to the wireless carrier or to a location network service provider such as TimesThree® or US Wireless. The network provider responds with the geographic location (accurate within 75 meters) of the cell phone caller.

Advertising (197)
  Administers the insertion of advertisements within each call. The advertising service can deliver targeted ads based on user profile information.
  Interfaces to external advertising services such as Wyndwire® are provided.

Transactions (198)
  Provides transaction infrastructure such as shopping cart, tax and shipping calculations, and interfaces to external payment systems.

Notification (199)
  Provides external and internal notifications based on a timer or on external events such as stock price movements. For example, a user can request that he/she receive a telephone call every day at 8 a.m.
  Services can request that they receive a notification to perform an action at a pre-determined time. For example, the content service 180 can request that it receive an instruction every night to archive old content.

3$^{rd}$ Party Service Adapter (190)
  Enables 3$^{rd}$ parties to develop and use their own external services. For instance, if a customer wants to leverage a proprietary system, the 3$^{rd}$ party service adapter can enable it as a service that is available to applications.

Presentation Layer (152)
  The presentation layer 152 provides the mechanism for communicating with the end user. While the application layer 154 manages the application logic, the presentation layer 152 translates the core logic into a medium that a user's device can understand. Thus, the presentation layer 152 enables multi-modal support. For instance, end users can interact with the platform through a telephone, WAP session, HTML session, pager, SMS, facsimile, and electronic mail. Furthermore, as new "touchpoints"emerge, additional modules can seamlessly be integrated into the presentation layer 152 to support them.

Telephony Server (158)

The telephony server 158 provides the interface between the telephony world, both Voice over Internet Protocol (VoIP) and Public Switched Telephone Network (PSTN), and the applications running on the platform. It also provides the interface to speech recognition and synthesis engines 153. Through the telephony server 158, one can interface to other $3^{rd}$ party application servers 190 such as unified messaging and conferencing server. The telephony server 158 connects to the telephony switches and "handles" the phone call.

Features of the telephony server 158 include:
Mission critical reliability.
Suite of operations and maintenance tools.
Telephony connectivity via ISDN/T1/E1, SIP and SS7 protocols.
DSP-based telephony boards offload the host, providing real-time echo cancellation, DTMF & call progress detection, and audio compression/decompression.

Speech Recognition Server (155)

The speech recognition server 155 performs speech recognition on real time voice streams from the telephony server 158. The speech recognition server 155 may support the following features:
Carrier grade scalability & reliability
Large vocabulary size
Industry leading speaker independent recognition accuracy
Recognition enhancements for wireless and hands free callers
Dynamic grammar support—grammars can be added during run time.
Multi-language support
Barge in—enables users to interrupt voice applications. For example, if a user hears "Please say a name of a football team that you," the user can interject by saying "Miami Dolphins" before the system finishes.
Speech objects provide easy to use reusable components
"On the fly" grammar updates
Speaker verification Audio Manager (157)
Manages the prompt server, text-to-speech server, and streaming audio.

Prompt Server (153)
The Prompt server is responsible for caching and managing pre-recorded audio files for a pool of telephony servers.

Text-to-Speech Server (153)

When pre-recorded prompts are unavailable, the text-to-speech server is responsible for transforming text input into audio output that can be streamed to callers on the telephony server 158. The use of the TTS server offloads the telephony server 158 and allows pools of TTS resources to be shared across several telephony servers. Features include:
Support for industry leading technologies such as Speech Works® Speechify® and L&H RealSpeak®.
Standard Application Program Interface (API) for integration of other TTS engines.

Streaming Audio
The streaming audio server enables static and dynamic audio files to be played to the caller. For instance, a one minute audio news feed would be handled by the streaming audio server.

Support for standard static file formats such as WAV and MP3
Support for streaming (dynamic) file formats such as Real Audio® and Windows® Media®.

PSTN Connectivity
Support for standard telephony protocols like ISDN, E&M WinkStart®, and various flavors of E1 allow the telephony server 158 to connect to a PBX or local central office.

SIP Connectivity
The platform supports telephony signaling via the Session Initiation Protocol (SIP). The SIP signaling is independent of the audio stream, which is typically provided as a G711 RTP stream. The use of a SIP enabled network can be used to provide many powerful features including:
Flexible call routing
Call forwarding
Blind & supervised transfers
Location/presence services
Interoperable with SIP compliant devices such as soft switches
Direct connectivity to SIP enabled carriers and networks
Connection to SS7 and standard telephony networks (via gateways)

Admin Web Server
Serves as the primary interface for customers.
Enables portal management services and provides billing and simple reporting information. It also permits customers to enter problem ticket orders, modify application content such as advertisements, and perform other value added functions.
Consists of a website with backend logic tied to the services and application layers. Access to the site is limited to those with a valid user id and password and to those coming from a registered IP address. Once logged in, customers are presented with a homepage that provides access to all available customer resources.

Other (168)
Web-based development environment that provides all the tools and resources developers need to create their own speech applications.
Provides a VoiceXML Interpreter that is:
Compliant with the VoiceXML 1.0 specification.
Compatible with compelling, location-relevant SpeechObjects—including grammars for nationwide US street addresses.
Provides unique tools that are critical to speech application development such as a vocal player. The vocal player addresses usability testing by giving developers convenient access to audio files of real user interactions with their speech applications. This provides an invaluable feedback loop for improving dialogue design.

WAP, HTML, SMS, Email, Pager, and Fax Gateways
Provide access to external browsing devices.
Manage (establish, maintain, and terminate) connections to external browsing and output devices.
Encapsulate the details of communicating with external device.
Support both input and output on media where appropriate. For instance, both input from and output to WAP devices.
Reliably deliver content and notifications.

Figure 2:
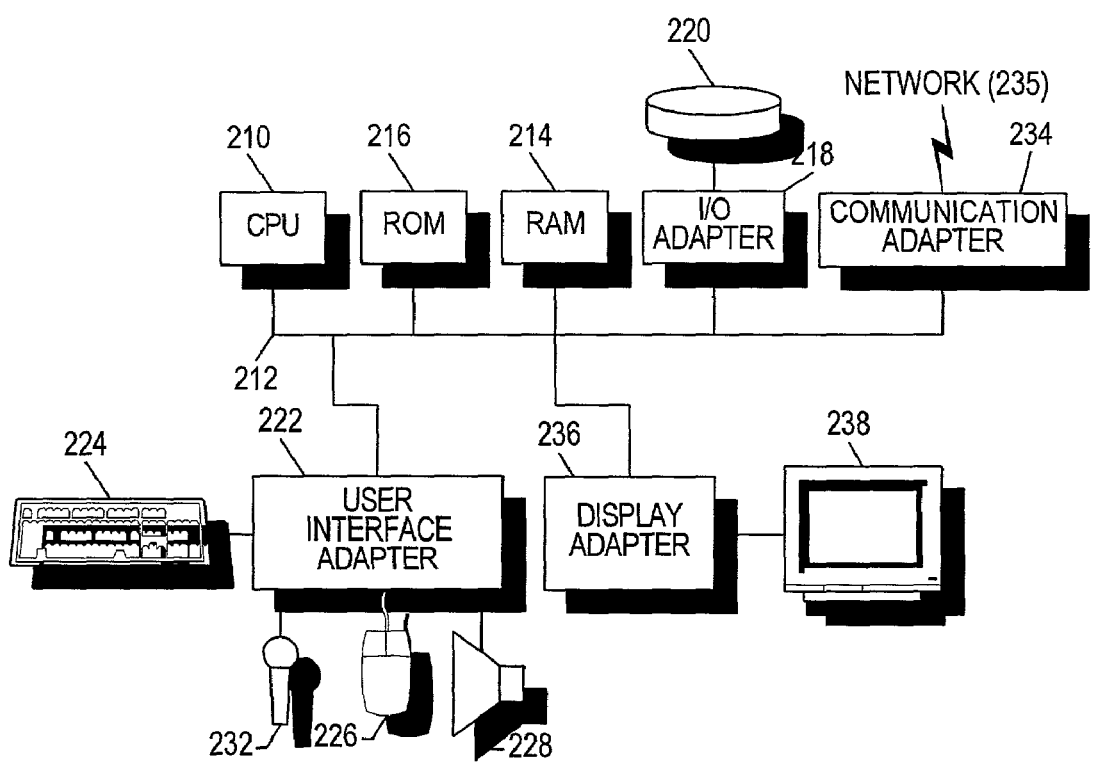
FIG. 2 shows a representative hardware environment associated with the computer systems of the platform illustrated in FIG. 1.

FIG. 2 shows a representative hardware environment associated with the various systems, i.e. computers, servers, etc., of FIG. 1. FIG. 2 illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Figure 3:
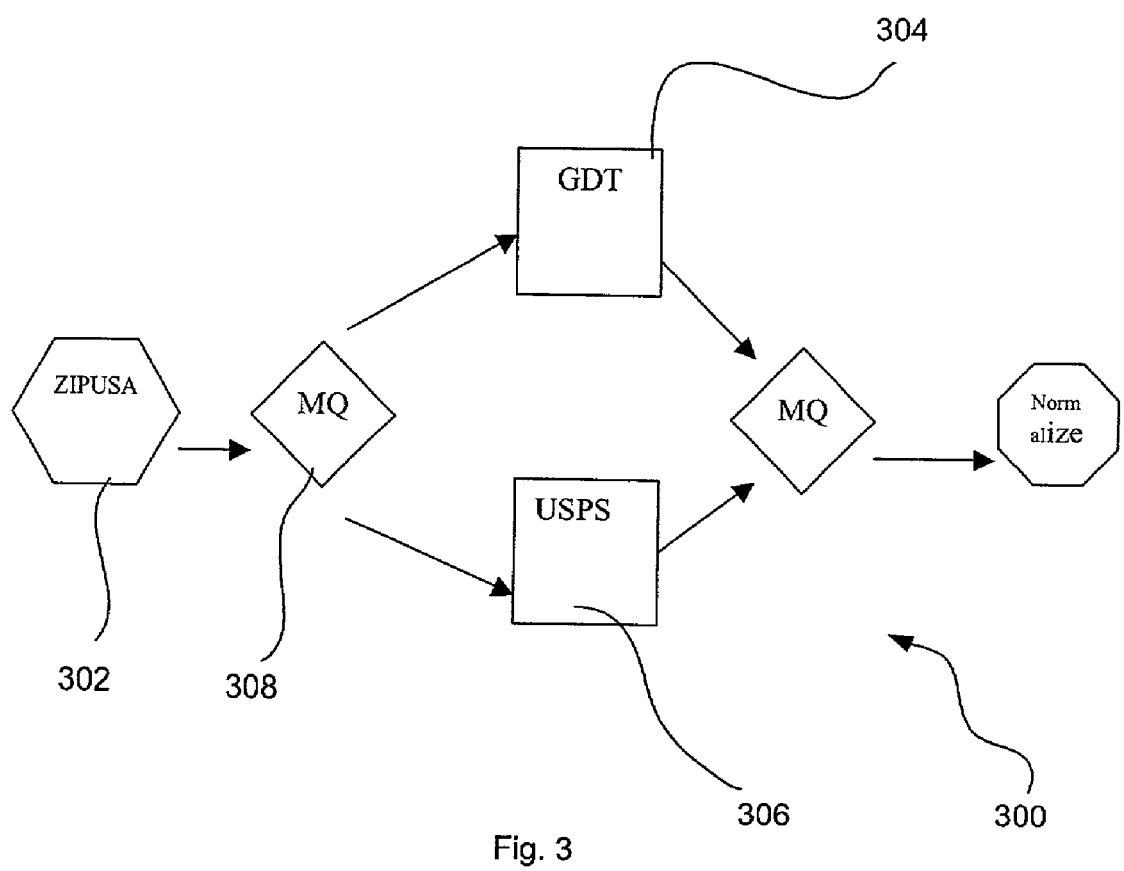
FIG. 3 is a schematic diagram showing one exemplary combination of databases that may be used for generating a collection of grammars.

In an embodiment of the present invention, a database may need to be established with all of the necessary grammars. In one embodiment of the present invention, the database may be populated with a multiplicity of street names for voice recognition purposes. In order to get the best coverage for all the street names, data from multiple data sources may be merged. FIG. 3 is a schematic diagram showing one exemplary combination of databases 300. In the present embodiment, such databases may include a first database 302 including city names and associated zip codes (i.e. a ZIPUSA database), a second database 304 including street names and zip codes (i.e. a Geographic Data Technology (GDT) database), and/or a United States Postal Services (USPS) database 306. In other embodiments, any other desired databases may be utilized. Further tools may also be utilized such as a server 308 capable of verifying street, city names, and zip codes.

Figure 4A:
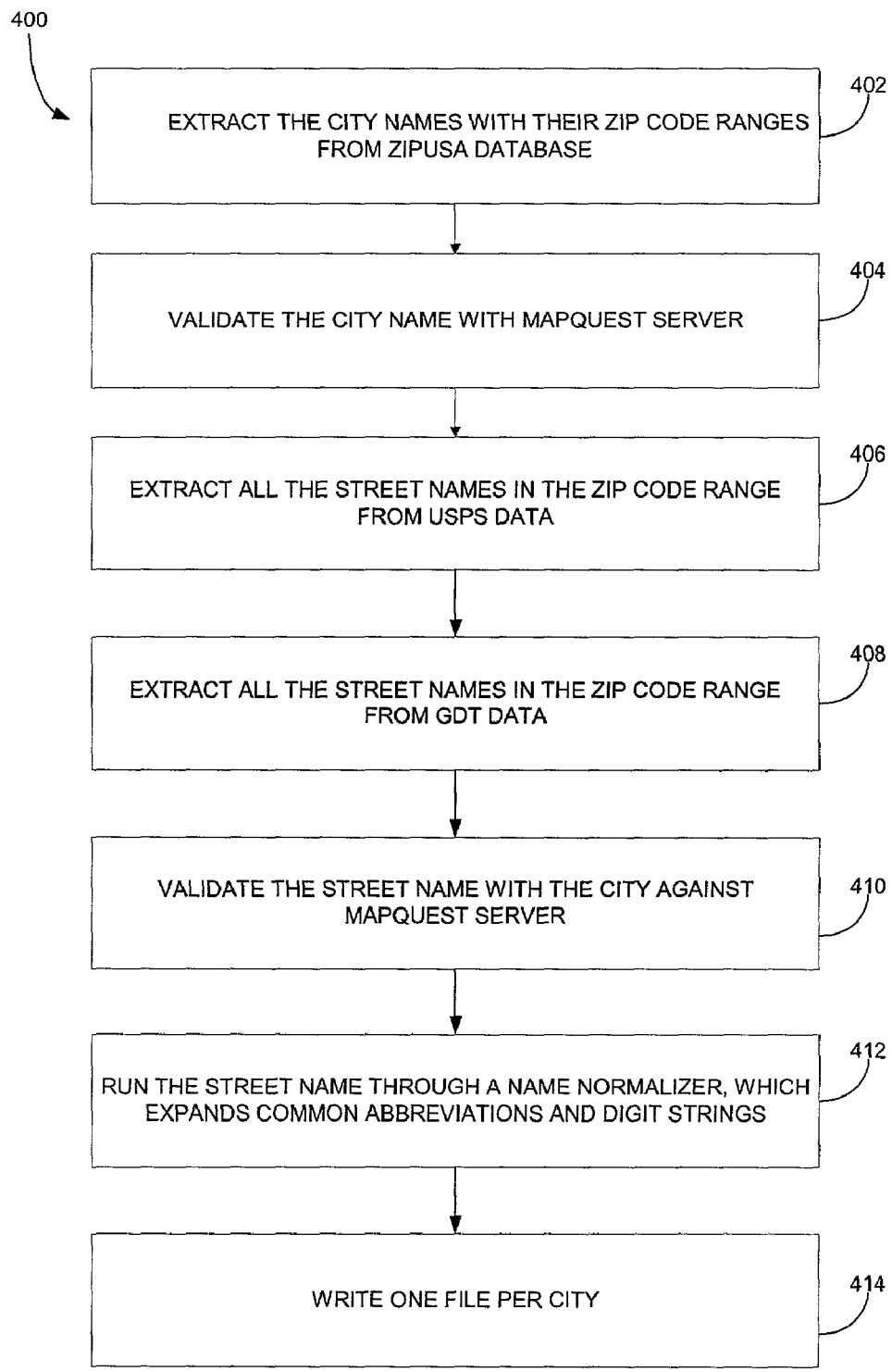
FIG. 4A illustrates a gathering method for collecting a large number of grammars such as all of the street names in the United States of America using the combination of databases shown in FIG. 3.

FIG. 4A illustrates a gathering method 400 for collecting a large number of grammars such as all of the street names in the United States of America using the combination of databases 300 shown in FIG. 3. As shown in FIG. 4, city names and associated zip code ranges are initially extracted from the ZIPUSA database. Note operation 402. It is well known in the art that each city has a range of zip codes associated therewith. As an option, each city may further be identified using a state and/or county identifier. This may be necessary in the case where multiple cities exist with similar names.

Next, in operation 404, the city names are validated using a server capable of verifying street names, city names, and zip codes. In one embodiment, such server may take the form of a MapQuest server. This step is optional for ensuring the integrity of the data.

Figure 4B:
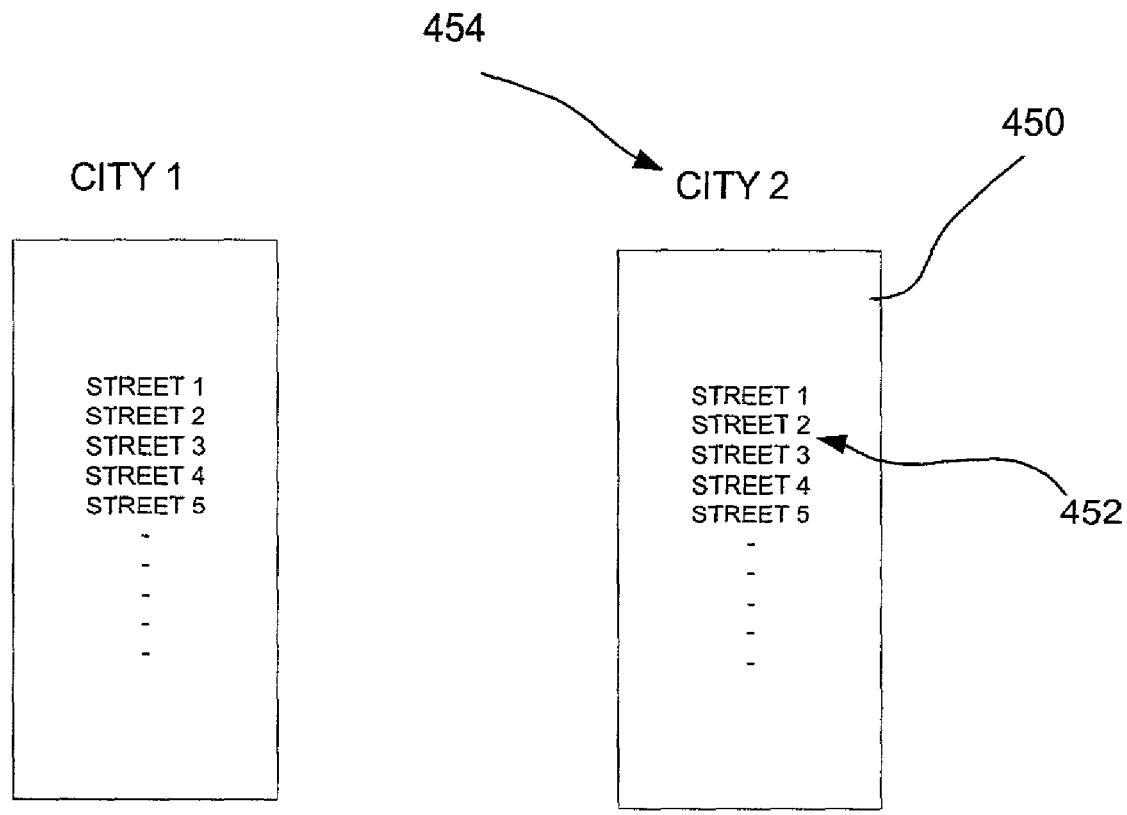
FIG. 4B illustrates a pair of exemplary lists showing a plurality of streets names organized according to city.

Thereafter, all of the street names in the zip code range are extracted from USPS data in operation 406. In a parallel process, the street names in the zip code range are similarly extracted from the GDT database. Note operation 408. Such street names are then organized in lists according to city. FIG. 4B illustrates a pair of exemplary lists 450 showing a plurality of streets names 452 organized according to city 454. Again, in operation 410, the street names are validated using the server capable of verifying street names, city names, and zip codes.

It should be noted that many of the databases set forth hereinabove utilize abbreviations. In operation 412, the street names are run through a name normalizer, which expands common abbreviations and digit strings. For example, the abbreviations "St." and "Cr." can be expanded to "street" and "circle," respectively.

In operation 414, a file is generated for each city. Each of such files delineates each of the appropriate street names.

Figure 5:
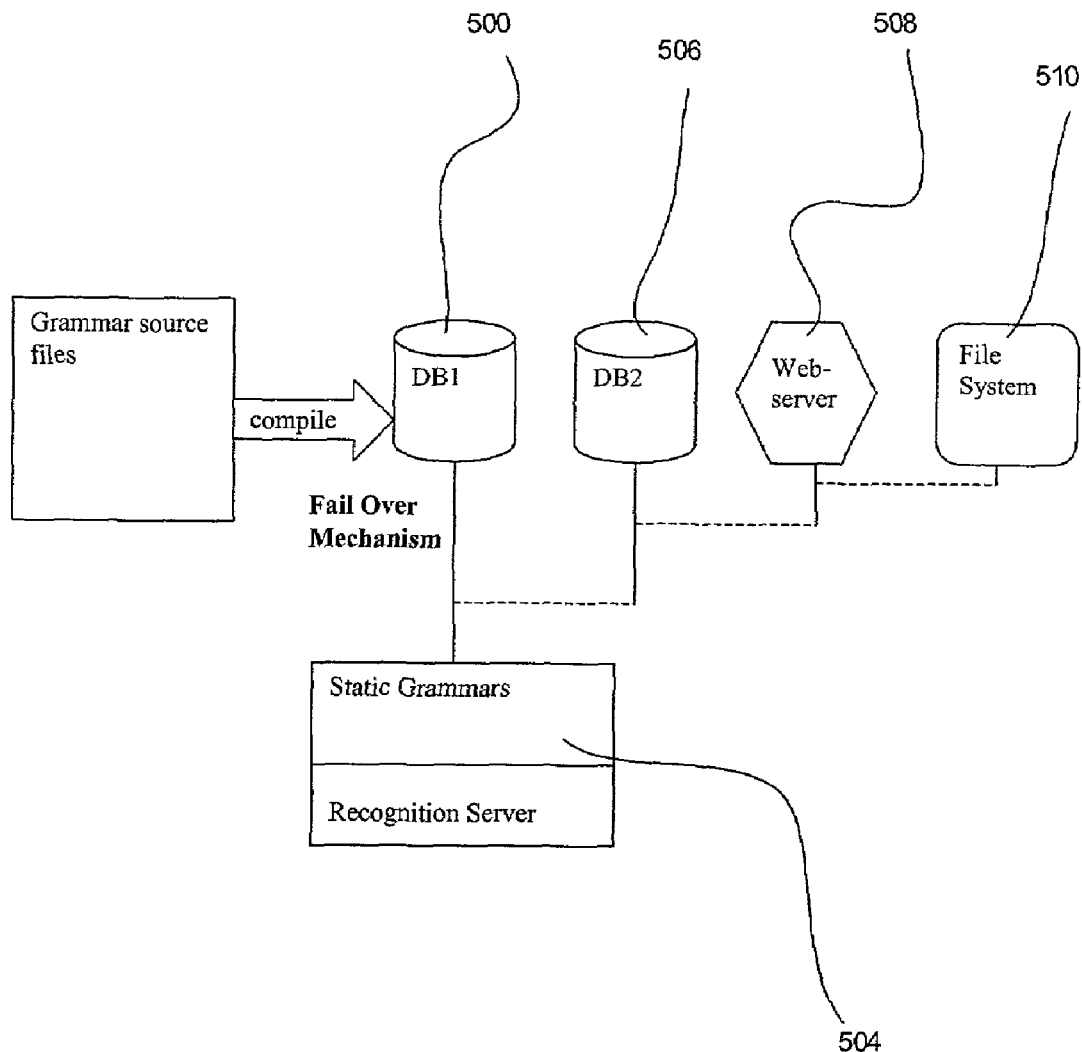
FIG. 5 illustrates a plurality of databases of varying types on which the grammars may be stored for retrieval during speech recognition.

FIG. 5 illustrates a plurality of databases 500 of varying types on which the grammars may be stored for retrieval during speech recognition. The present embodiment takes into account that only a small portion of the grammars will be used heavily used during use. Further, the overall amount of grammars is so large that it is beneficial for it to be distributed across several databases. Because network connectivity is involved, the present embodiment also provides for a fail-over scheme.

As shown in FIG. 5, a plurality of databases 500 are included having different types. For example, such databases may include a static database 504, dynamic database 506, web-server 508, file system 510, or any other type of database. Table 1 illustrates a comparison of the foregoing types of databases.

TABLE 1

| | When Compiled | On Server? | Protocol |
|---|---|---|---|
| Static | Offline | Yes | Proprietary Vendor |
| Dynamic | Offline | No | ORACLE ™ OCI |
| Web server | Runtime | No | HTTP |
| File System | Runtime | No | File System Access |

Figure 6:
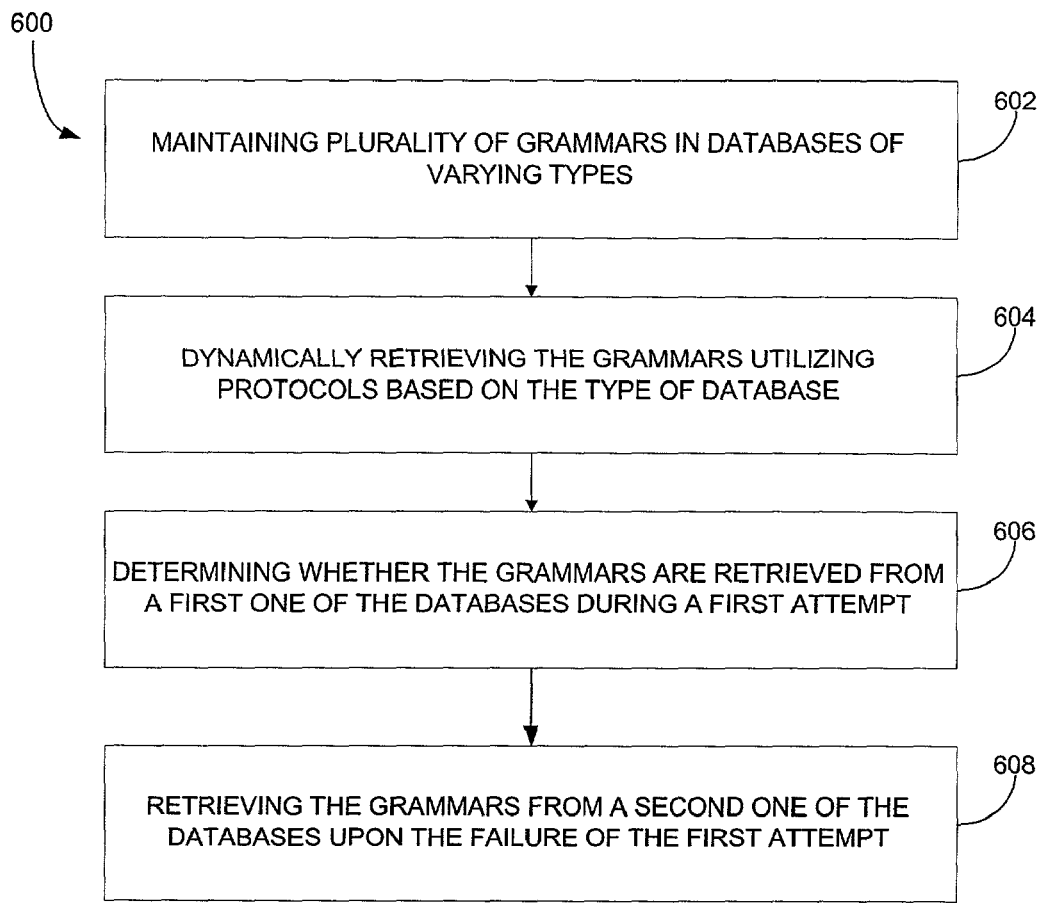
FIG. 6 illustrates a method for speech recognition using heterogeneous protocols associated with the databases of FIG. 5.

FIG. 6 illustrates a method 600 for speech recognition using heterogeneous protocols associated with the databases of FIG. 5. Initially, in operation 602, a plurality of grammars, i.e. street names, are maintained in databases of different types. In one embodiment, the types may include static, dynamic, web server, and/or file system, as set forth hereinabove.

During use, in operation 604, the grammars are dynamically retrieved utilizing protocols based on the type of the database. Retrieval of the grammars may be initially attempted from a first database. The database subject to such initial attempt may be selected based on the type, the specific content thereof, or a combination thereof.

For example, static databases may first be queried for the grammars to take advantage of their increased efficiency and speed, while the remaining types may be used as a fail-over mechanism. Moreover, the static database to be initially queried may be populated with grammars that are most prevalently used. By way of example, a static database with just New York streets may be queried in response to a request from New York. As such, one can choose to include certain highly used grammars as static grammars (thus reducing network traffic), while other databases with lesser used grammars may be accessible through various other network protocols.

Further, by storing the same grammar in more than one node in such a distributed architecture, a control flow of the grammar search algorithm could point to a redundant storage area if required. As such, a fail-over mechanism is provided. By way of example, in operation 606, it may be determined whether the grammars may be retrieved from a first one of the databases during a first attempt. Upon the failure of the first attempt, the grammars may be retrieved from a second one of the databases, and so on. Note operation 608.

The present approach thus includes distributing grammar resources across a variety of data storage types (static packages, dynamic grammar databases, web servers, file systems), and allows the control flow of the application to search for the grammars in all the available resources until it is found.

Figure 7:
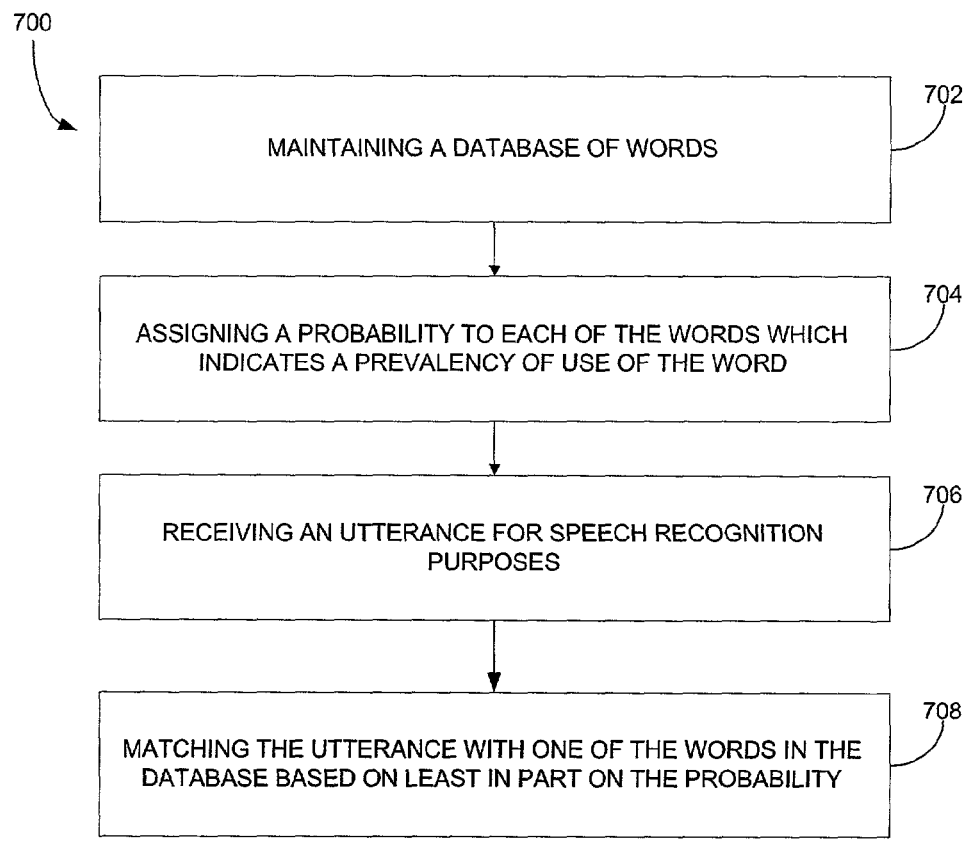
FIG. 7 illustrates a method for providing a speech recognition method that improves the recognition of street names, in accordance with one embodiment.

FIG. 7 illustrates a method 700 for providing a speech recognition method that improves the recognition of street names, in accordance with one embodiment of the present invention. In order to reduce the phonetic confusability due to the existence of smaller streets whose names happen to be phonetically similar to that of more popular streets, traffic count statistics may be used when recognizing the grammars to weigh each street.

During operation 702, a database of words is maintained. Initially, in operation 704, a probability is assigned to each of the words, i.e. street names, which indicates a prevalency of use of the word. As an option, the probability may be determined using statistical data corresponding to use of the streets. Such statistical data may include traffic counts such as traffic along the streets and along intersecting streets.

The traffic count information may be given per intersection. One proposed scheme to extract probabilities on a street-to-street basis will now be set forth. The goal is to include in the grammar probabilities for each street that would predict the likelihood users will refer to it. It should be noted that traffic counts are an empirical indication of the importance of a street.

In use, data may be used which indicates an amount of traffic at intersections of streets. Equation #1 illustrates the form of such data. It should be noted that data in such form is commonly available for billboard advertising purposes.

TrafficIntersection(streetA, streetB)=X

TrafficIntersection(streetA, streetC)=Y

TrafficIntersection(streetA, streetD)=Z

TrafficIntersection(streetB, streetC)=A      Equation #1

To generate a value corresponding to a specific street, all of the intersection data involving such street may be aggregated. Equation #2 illustrates the manner in which the intersection data is aggregated for a specific street.

Traffic(streetA)=X+Y+Z      Equation #2

The aggregation for each street may then be normalized. One exemplary method of normalization is represented by Equation #3.

Normalization Traffic(streetA)=$\log_{10}(X+Y+Z)$      Equation #3

Such normalized values may then be used to categorize each of the streets in terms of prevalency of use. Preferably, this is done separately for each city. Each category is assigned a constant scalar associated with the popularity of the street. By way of example, the constant scalars 1, 2 and 3 maybe assigned to normalized aggregations 0.01, 0.001, and 0.0001, respectively. Such popularity may then be added to the city grammar file to be used during the speech recognition process.

During use, an utterance is received for speech recognition purposes. Note operation 706. Such utterance is matched with one of the words in the database based at least in part on the probability, as indicated by operation 708. For example, when confusion is raised as to which of two or more streets an utterance is referring, the street with the highest popularity (per the constant scalar indicator) is selected as a match.

Exemplary Speech Recognition Process

An exemplary speech recognition process will now be set forth. It should be understood that the present example is offered for illustrative purposes only, and should not be construed as limiting in any manner.

Figure 8:
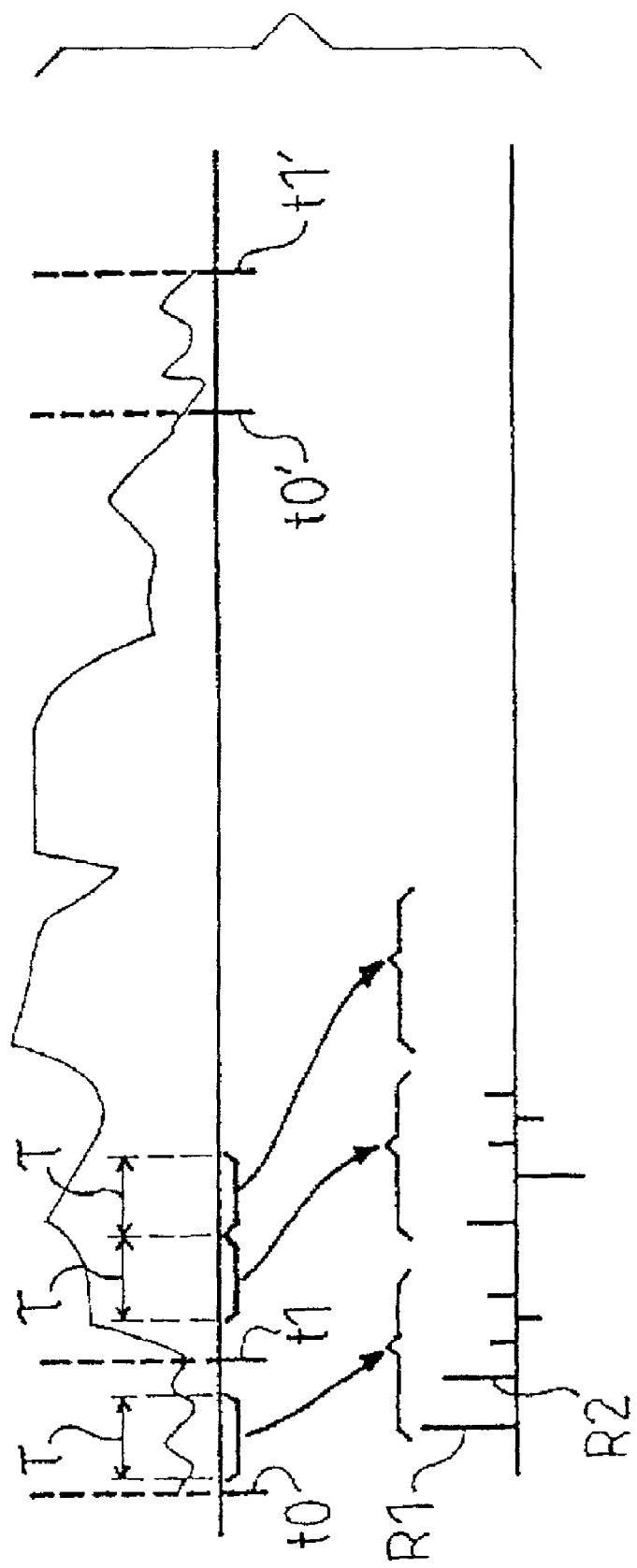
FIGS. 8–11 illustrate an exemplary speech recognition process, in accordance with one embodiment of the present invention.

FIG. 8 shows a timing diagram which represents the voice signals in A. According to the usual speech recognition techniques, such as explained in above-mentioned European patent, evolutionary spectrums are determined for these voice signals for a time tau represented in B in FIG. 8 by the spectral lines R1, R2 . . . The various lines of this spectrum obtained by fast Fourier transform, for example, constitute vectors. For determining the recognition of a word, these various lines are compared with those established previously which form the dictionary and are stored in memory.

Figure 9:
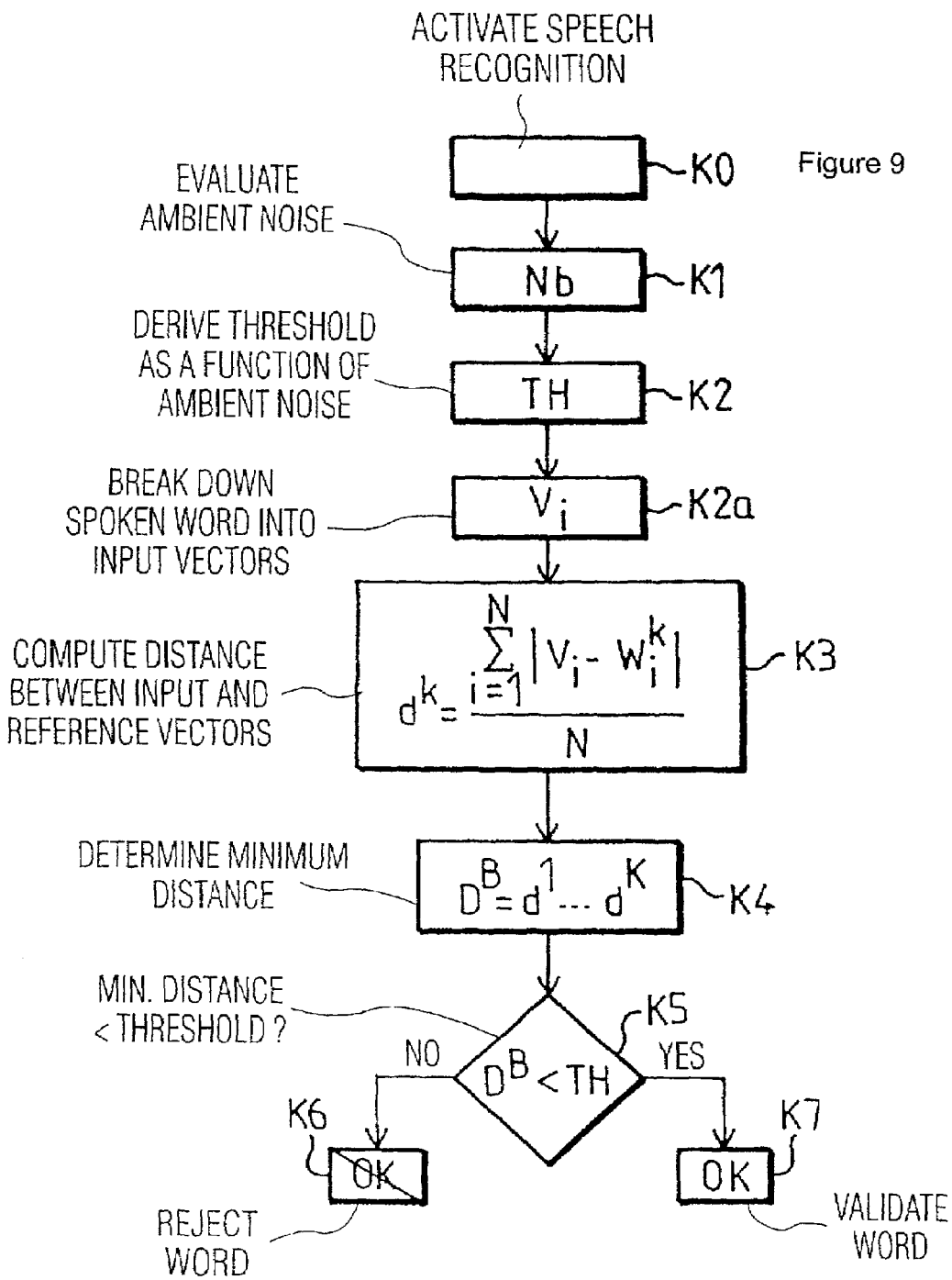
Figure 10:
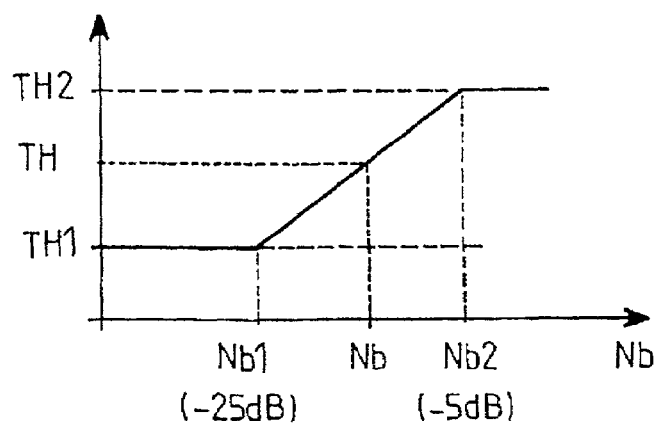

FIG. 9 shows the flow chart which explains the method according to the invention. Box K0 represents the activation of speech recognition; this may be made by validating an item on a menu which appears on the screen of the device. Box K1 represents the step of the evaluation of ambient noise. This step is executed between the instants t0 and t1 (see FIG. 8) between which the speaker is supposed not to speak, i.e. before the speaker has spoken the word to be recognized. Supposing Nb is this value which is expressed in dB relative to the maximum level (if one works with 8 bits, this maximum level 0 dB is given by 1111 1111). This measure is taken considering the mean value of the noise vectors, their moduli, or their squares. From this level measured in this manner is derived a threshold TH (box K2) as a function of the curve shown in FIG. 10. Box K2a represents the breakdown of a spoken word to be recognized into input vectors $V_i$. Box K3 indicates the computation of the distances $d^k$ between the input vectors $V_i$ and the reference vectors $w^K_i$. This distance is evaluated based on the absolute value of the differences between the components of these vectors. In box K4 is determined the minimum distance $D^B$ among the minimum distances which have been computed. This minimum value is compared with the threshold value TH, box K5. If this value is higher than the threshold TH, the word is rejected in box K6, if not, it is declared recognized in box K7.

Figure 11:
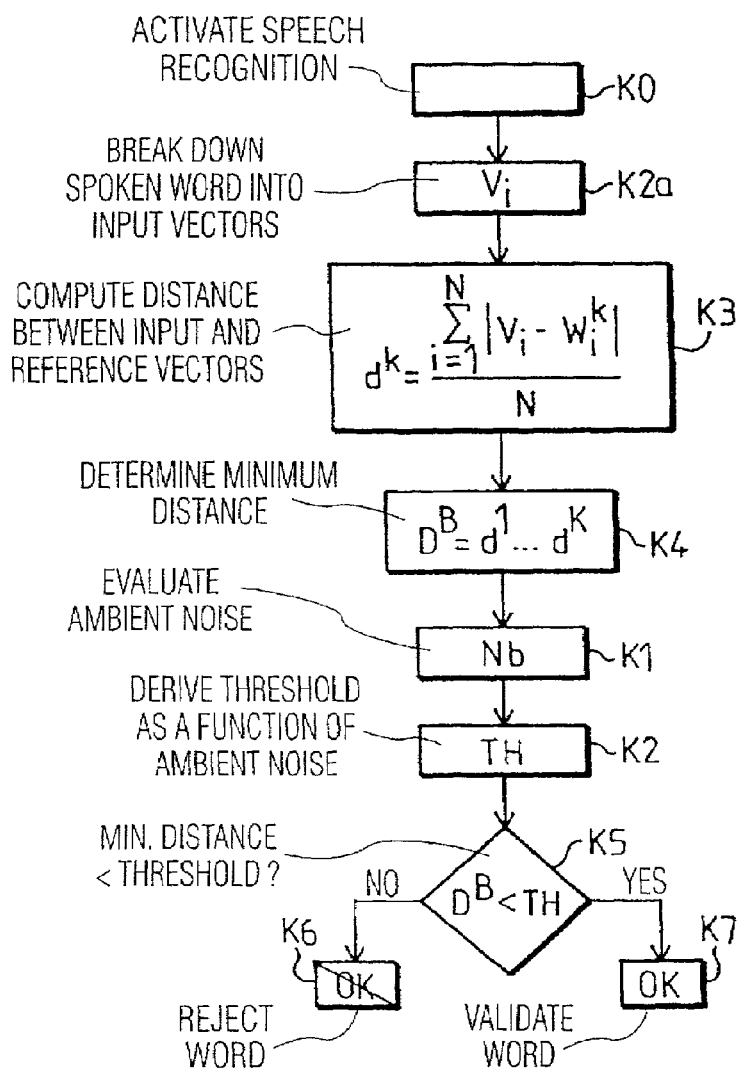

The order of various steps may be reversed in the method according to the invention. As this is shown in FIG. 11, the evaluation of the ambient noise may also be carried out after the speaker has spoken the word to be recognized, that is, between the instants t0' and t1' (see FIG. 8). This is translated in the flow chart of FIG. 11 by the fact that the steps K1 and K2 occur after step K4 and before decision step K5.

The end of this ambient noise evaluation step, according to a characteristic feature of the invention, may be signaled to the speaker in that a beep is emitted, for example, by a loudspeaker which then invites the speaker to speak. The present embodiment has taken into account that a substantially linear function of the threshold value as a function of the measured noise level in dB was satisfactory. Other functions may be found too, without leaving the scope of the invention therefore.

If the distances vary between a value from 0 to 100, the values of TH1 may be 10 and those of TH2 80 for noise levels varying from −25 dB to −5 dB.

Exemplary Applications

Various applications of the foregoing technology will now be set forth. It should be noted that such applications are for illustrative purposes, and should not be construed limiting in any manner.

Figure 12:
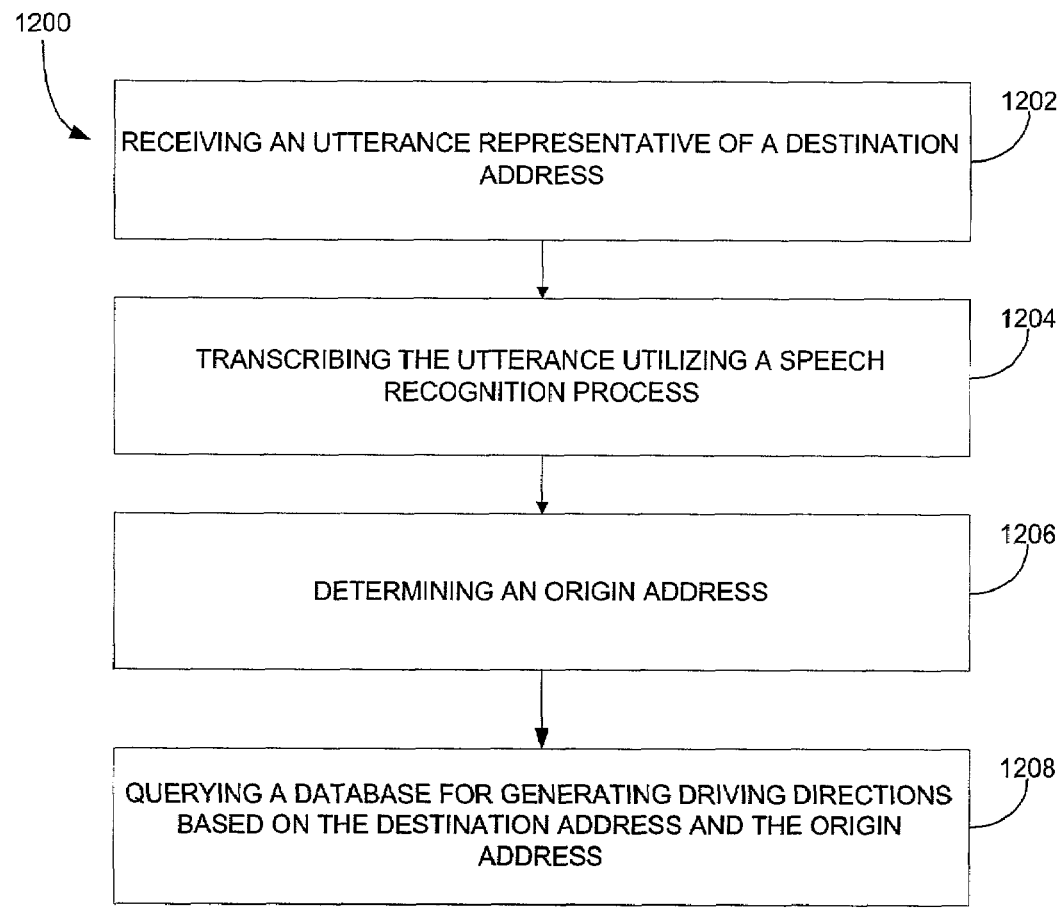
FIG. 12 illustrates a method for providing voice-enabled driving directions, in accordance with one exemplary application embodiment of the present invention.

FIG. 12 illustrates a method 1200 for providing voice-enabled driving directions. Initially, in operation 1202, an utterance representative of a destination address is received. It should be noted that the addresses may include street names or the like. Such utterance may also be received via a network.

Thereafter, in operation 1204, the utterance is transcribed utilizing a speech recognition process. As an option, the speech recognition process may include querying one of a plurality of databases based on the origin address. Such database that is queried by the speech recognition process may include grammars representative of addresses local to the origin address.

An origin address is then determined. Note operation 1206. In one embodiment of the present invention, the origin address may also be determined utilizing the speech recognition process. It should be noted that global positioning system (GPS) technology or other methods may also be utilized for such purpose.

A database is subsequently for queried generating driving directions based on the destination address and the origin address, as indicated in operation 1208. In particular, a server (such as a MapQuest server) may be utilized to generate such driving directions. Further, such driving directions may optionally be sounded out via a speaker or the like.

Figure 13:
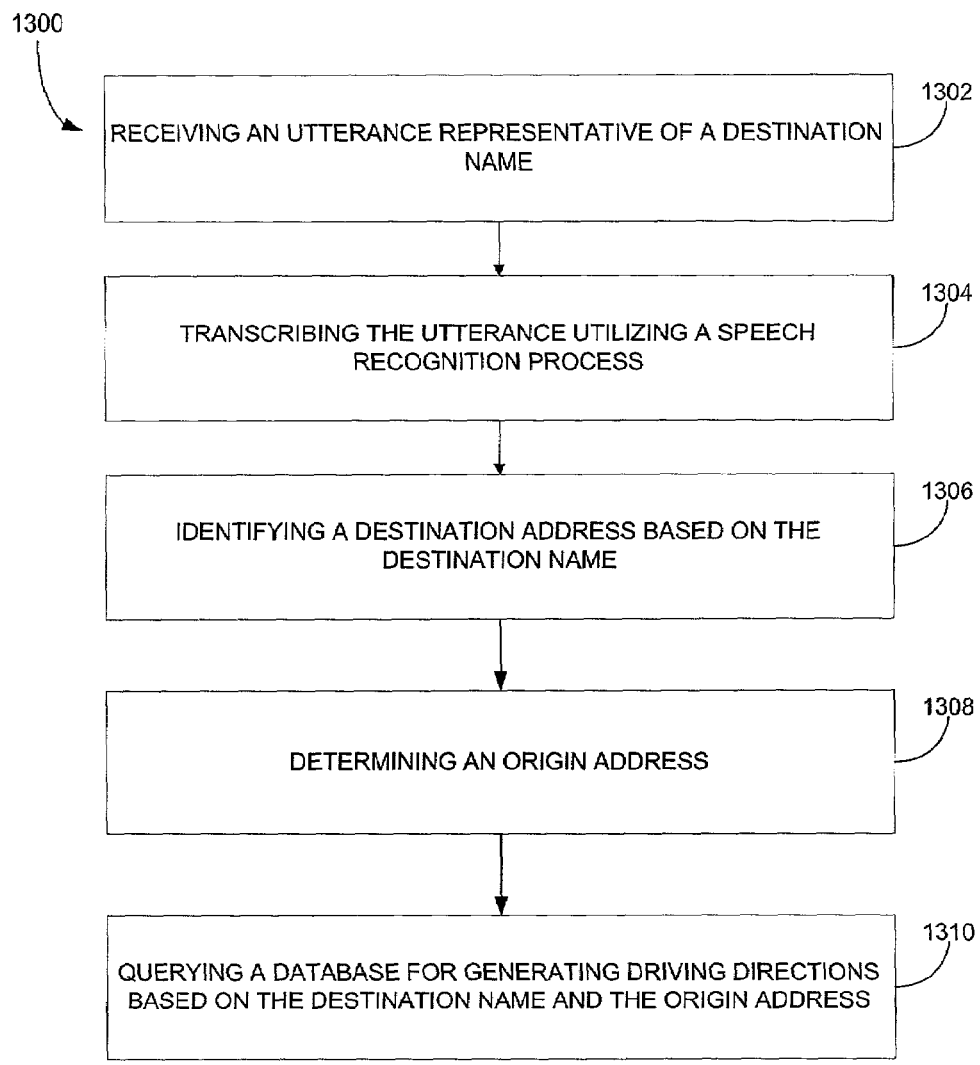
FIG. 13 illustrates a method for providing voice-enabled driving directions based on a destination name, in accordance with another exemplary application embodiment of the present invention.

FIG. 13 illustrates a method 1300 for providing voice-enabled driving directions based on a destination name. Initially, in operation 1302, an utterance representative of a destination name is received. Optionally, the destination name may include a category and/or a brand name. Such utterance may be received via a network.

In response to the receipt thereof, the utterance is transcribed utilizing a speech recognition process. See operation 1304. Further, in operation 1306, a destination address is identified based on the destination name. It should be noted that the addresses may include street names. To accomplish this, a database may be utilized which includes addresses associated with business names, brand names, and/or goods and services. Optionally, such database may include a categorization of the goods and services, i.e. virtual yellow pages, etc.

Still yet, an origin address is identified. See operation 1308. In one embodiment of the present invention, the origin address may be determined utilizing the speech recognition process. It should be noted that global positioning system (GPS) technology or other techniques may also be utilized for such purpose.

Based on such destination name and origin address, a database is subsequently queried for generating driving directions. Note operation 1310. Similar to the previous embodiment, a server (such as a MapQuest server) may be utilized to generate such driving directions, and such driving directions may optionally be sounded out via a speaker or the like.

Figure 14:
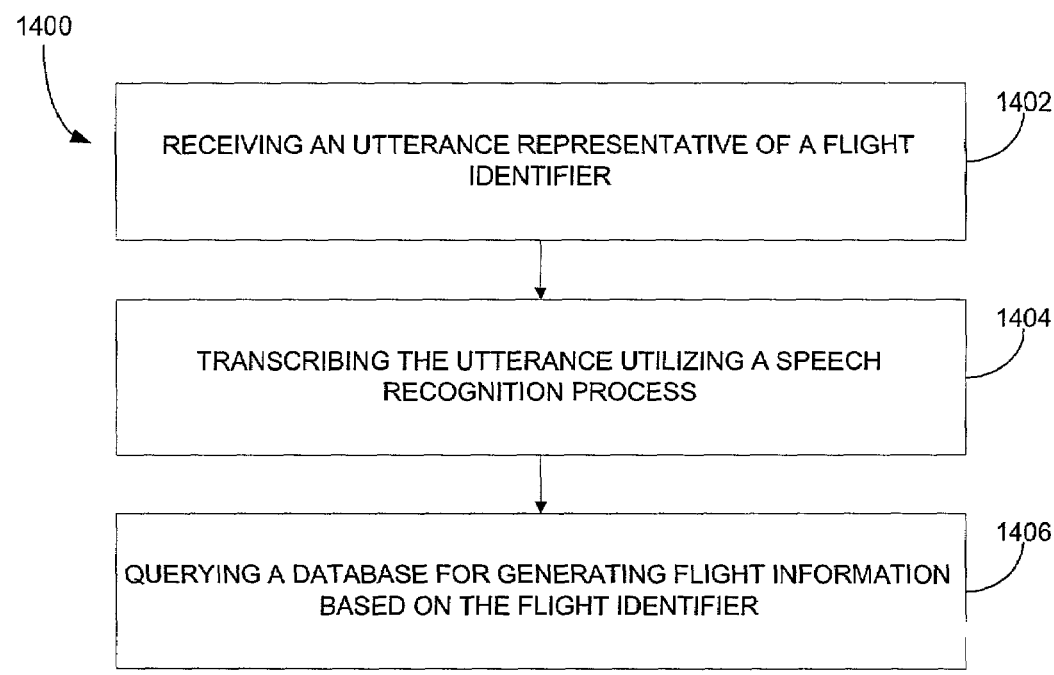
FIG. 14 illustrates a method for providing voice-enabled flight information, in accordance with another exemplary application embodiment of the present invention.

FIG. 14 illustrates a method 1400 for providing voice-enabled flight information. Initially, in operation 1402, an utterance is received representative of a flight identifier. Optionally, the flight identifier may include a flight number. Further, such utterance may be received via a network.

Utilizing a speech recognition process, the utterance is then transcribed. Note operation 1404. Further, in operation 1406, a database is queried for generating flight information based on the flight identifier. As an option, the flight information may include a time of arrival of the flight, a flight delay, or any other information regarding a particular flight.

Figure 15:
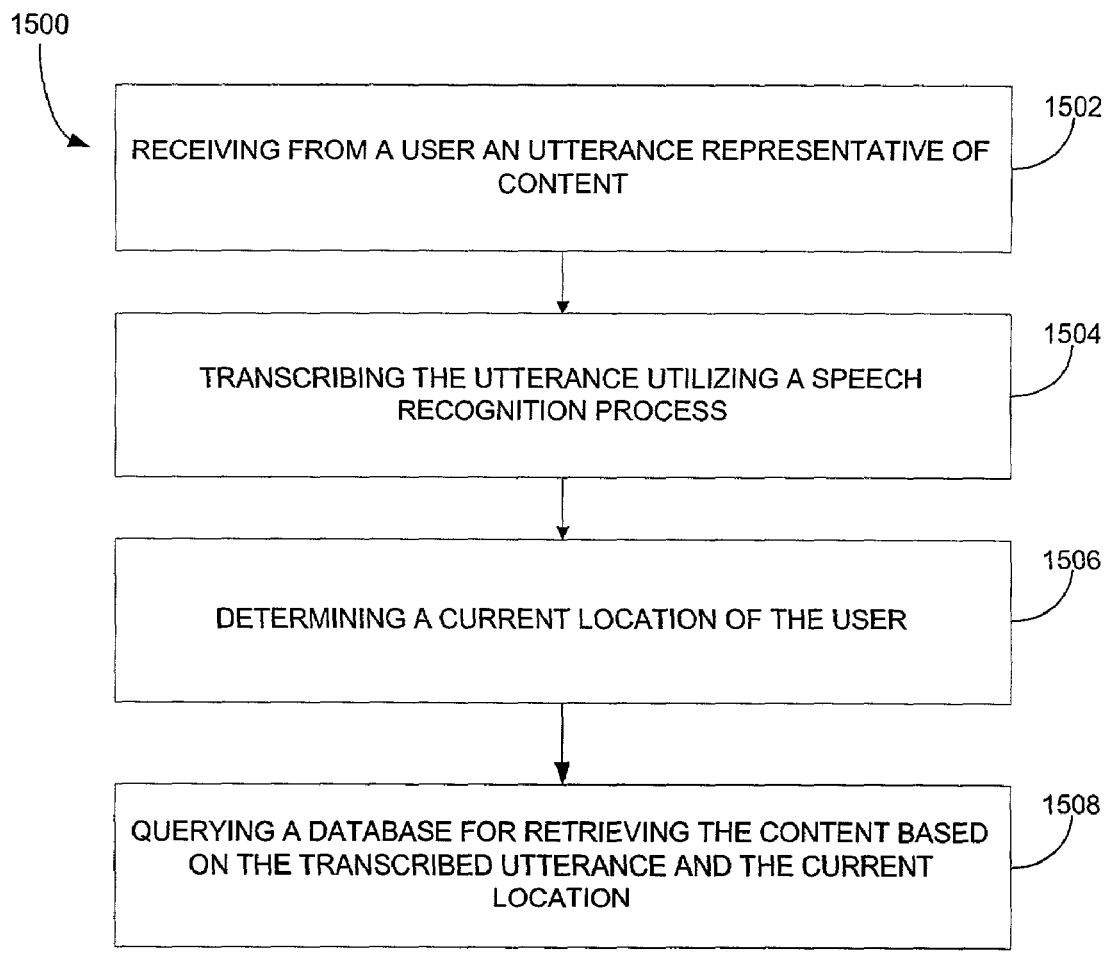
FIG. 15 illustrates a method for providing localized content, in accordance with still another exemplary application embodiment of the present invention.

FIG. 15 illustrates a method 1500 for providing localized content. Initially, an utterance representative of content is received from a user. Such utterance may be received via a network. Note operation 1502. In operation 1504, such utterance is transcribed utilizing a speech recognition process.

A current location of the user is subsequently determined, as set forth in operation 1506. In one embodiment of the present invention, the current location may be determined utilizing the speech recognition process. In another embodiment of the present invention, the current location may be determined by a source of the utterance. This may be accomplished using GPS technology, identifying a location of an associated inputting computer, etc.

Based on the transcribed utterance and the current location, a database is queried for generating the content. See operation 1508. Such content may, in one embodiment, include web-content taking the form of web-pages, etc.

As an option, the speech recognition process may include querying one of a plurality of databases based on the current address. It should be noted that the database queried by the speech recognition process may include grammars representative of the current location, thus facilitating the retrieval of appropriate content.

Figure 16:
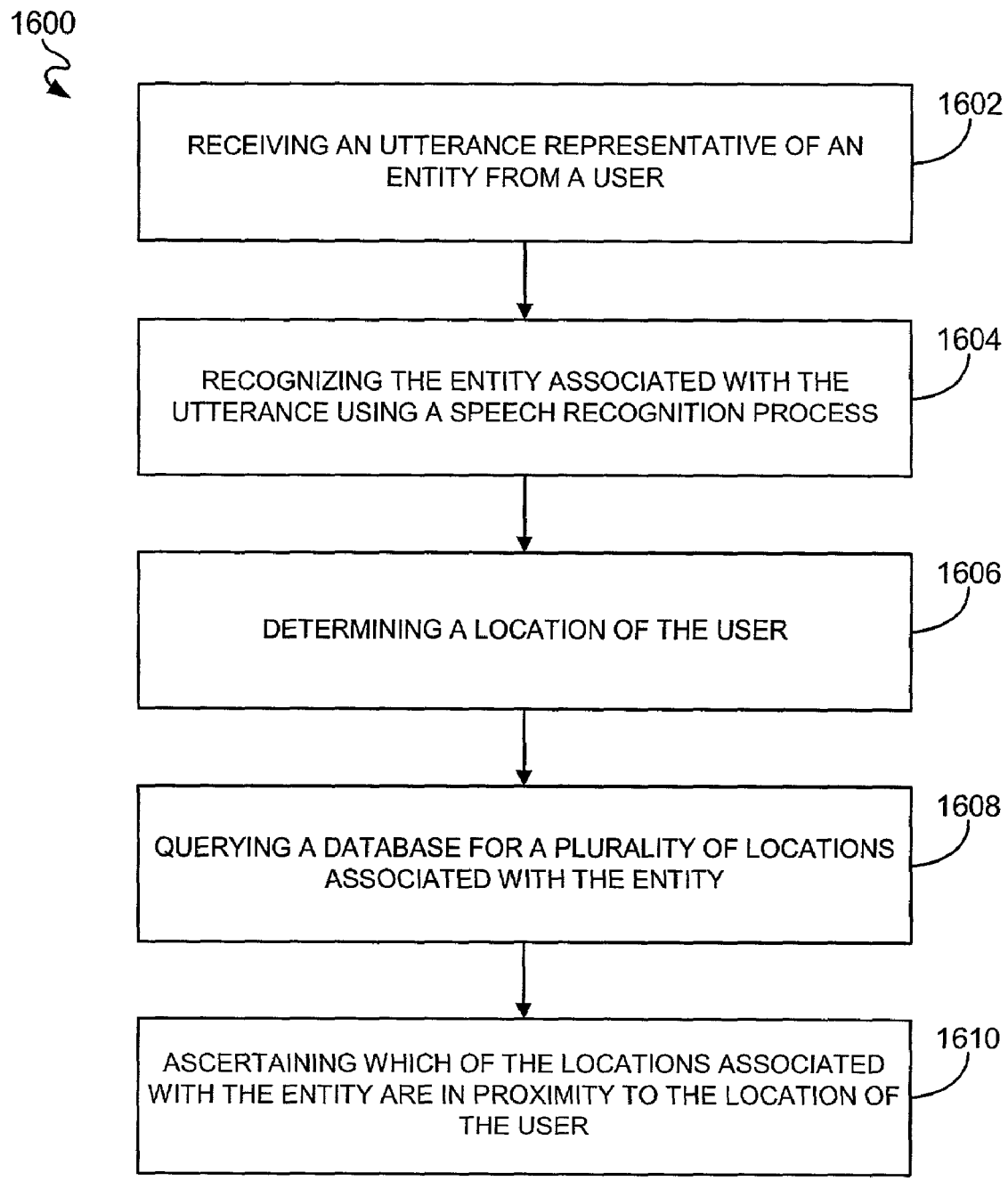
FIG. 16 is a flowchart of a process for determining an address of an entity based on a user location in accordance with an embodiment of the present invention.

FIG. 16 is a flowchart of a process 1600 for determining an address of an entity based on a user location in accordance with an embodiment of the present invention. An utterance representative of an entity is initially received from a user in operation 1602. The entity associated with the utterance is then recognized using a speech recognition process in operation 1604. An entity may be a business such as, that a user can identify by name such as, for example, "Wallmart" or "McDonald's." As another option, the user may identify the entity by uttering a category such as, for example, "restaurant," "liquor store" or "gas station."

Next, a location associated with the user is determined in operation 1606. In one aspect of the present invention, the location of the user may be the current location of the user. The location of the user can be determined by first eliciting or prompting the user to verbally identify his or her current location and utilizing a speech recognition process to comprehend the verbal utterances of the user. This can done by via a speech recognition portal (also known as a "voice portal" or "vortal"). The user can verbally provide, for example, a street address or an intersection at which the user is currently located. As another option, the user may verbally identify a location using an identifying utterance such as, for example, "home" to indicate the home of the user or "work" to indicate the workplace of the user. In such a situation, the home and/or workplace addresses of the user may be previously stored in a database in a record associated with the user so that a search process can be performed to retrieve the user's address from the database. Note: that in such a situation, the user does not actually have to be at the location associated with the user at the time of the session with the speech recognition portal. As another option, the location of the user may be obtained by connecting (via a network connection for example) to a global positioning system (GPS) device of the user—such as a wireless phone or PDA held in the hand of the user that includes a GPS system for determining the position of the user. This way, the user does not have to be prompted to provide information about his or her location.

With continuing reference to FIG. 16, a query is performed in operation 1608 to obtain information that identifies a plurality of locations associated with the entity. Based on the results of the query and the location of the user, it is then ascertained in operation 1610 which of the locations associated with the entity is in proximity to the location of the user. This query may be conducted using a database of addresses. Thus, in the illustrative example where the user is searching for the nearest McDonald's restaurant, a database that stores information (including address information) about plurality of business (including McDonald's restaurants) may be searched to find address information regarding the various McDonald's restaurants stored in the database. The locations of the McDonald's restaurants retrieved from the database are then compared to user's location to determine which of the McDonald's restaurants is closest to the user's location. As another option, instead of or as well as searching a database, a network, such as the Internet, may be searched using an Internet search engine to obtain information about various McDonald's locations. With a search engine, it may not be necessary for a provider of the process 1600 set forth in FIG. 16 to maintain their own database of business addresses.

In an embodiment of the present invention, the user may then informed about the locations associated with the entity ascertained to be in proximity to the location of the user. In such an embodiment, the user may be audibly informed via a speech recognition portal (also known as a "voice portal" or "vortal") about the locations associated with the entity ascertained to be in proximity to the location of the user. As another option, the user may be informed via an electronic message transmitted utilizing a network about the locations associated with the entity ascertained to be in proximity to the location of the user. The electronic message may be transmitted to a WAP enabled device of the user such as, for example, a WAP enabled wireless telephone or personal digital assistant (PDA).

In another aspect, the utterances representative of the entity may include utterances representative of criteria of the user so that the locations associated with the entity ascertained to be in proximity to the location of the user satisfy the criteria of the user. In such an aspect, the criteria of the user may include for example a location associated with the entity currently holding a sale (or other similar type of event) and/or a currently open location associated with the entity. Continuing with the illustrative scenario involving McDonald's restaurants, the user may provide (through his or her utterances) the criteria that the restaurant be open for business at the current time (e.g., "tell me where the closest McDonald's that is open right now is located"). Then the database can be searched for information relating to the operating hours of each McDonald's restaurant and then use this information to ascertain which of the currently open McDonald's are in proximity to the user. Thus, based on the criteria, the entity that is physically closest to the location of the user may not be the one that is ascertained to be closest to the user is it fails to meet the user's criteria. In an embodiment of the present invention, directions (such as driving or walking directions) from the location of the user to at least one of the locations associated with the entity ascertained to be in proximity to the location of the user may be generated and delivered to the user.

In another embodiment, communication may be facilitated between the user and at least one of the locations associated with the entity ascertained to be in proximity the location of the user. In a further embodiment, promotions may be offered to the user. For example, once it has been ascertained which location associated with the entity is closest to the location of the user, the user may be prompted as to whether the user would like to contact this location. If the user indicates affirmatively, a call may then automatically be made by the system to connect the user to the location of the entity so that the user can speak with a representative of the entity. An exemplary scenario of this aspect is if the user is looking for the closest restaurant of a restaurant chain and the user desires to make a reservation with that restaurant, the user can use this feature to have a call automatically placed with the restaurant so that the user can make the reservation.

In such an embodiment, the promotions offered to the user may be associated with one or more entities determined to be proximal to the location of the user. Examples of promotions can include: providing a code to the user to disclose to the entity so that the user can take advantage of the promotion. This code can be provided aurally via an electronic message to the user's phone or PDA for example.

In one embodiment, it may also be determined which of the identified locations is closed to the location associated with the user. In a further embodiment, a ranking may be performed on the identified locations of the ascertained to be in proximity to the location associated with the user to rank the identified locations from closest to furthest from the location associated with the user.

The speech recognition system of the present invention may provide a plurality of voice portal applications that can be personalized based on a caller's location, delivered to any device and customized via an open development platform. Examples of various specific voice portal applications are set forth in Table 1.

TABLE 1

| | |
|---|---|
| Nationwide Business Finder | search engine for locating businesses representing popular brands demanded by mobile consumers. |
| Nationwide Driving Directions | point-to-point driving directions |
| Worldwide Flight Information | up-to-the-minute flight information on major domestic and international carriers |
| Nationwide Traffic Updates | real-time traffic information for metropolitan areas |
| Worldwide Weather | updates and extended forecasts throughout the world |
| News | audio feeds providing the latest national and world headlines, as well as regular updates for business, technology, finance, sports, health and entertainment news |
| Sports | up-to-the-minute scores and highlights from the NFL, Major League Baseball, NHL, NBA, college football, basketball, hockey, tennis, auto racing, golf, soccer and boxing |
| Stock Quotes | access to major indices and all stocks on the NYSE, NASDAQ, and AMEX exchanges |
| Infotainment | updates on soap operas, television dramas, lottery numbers and horoscopes |

Figure 17:
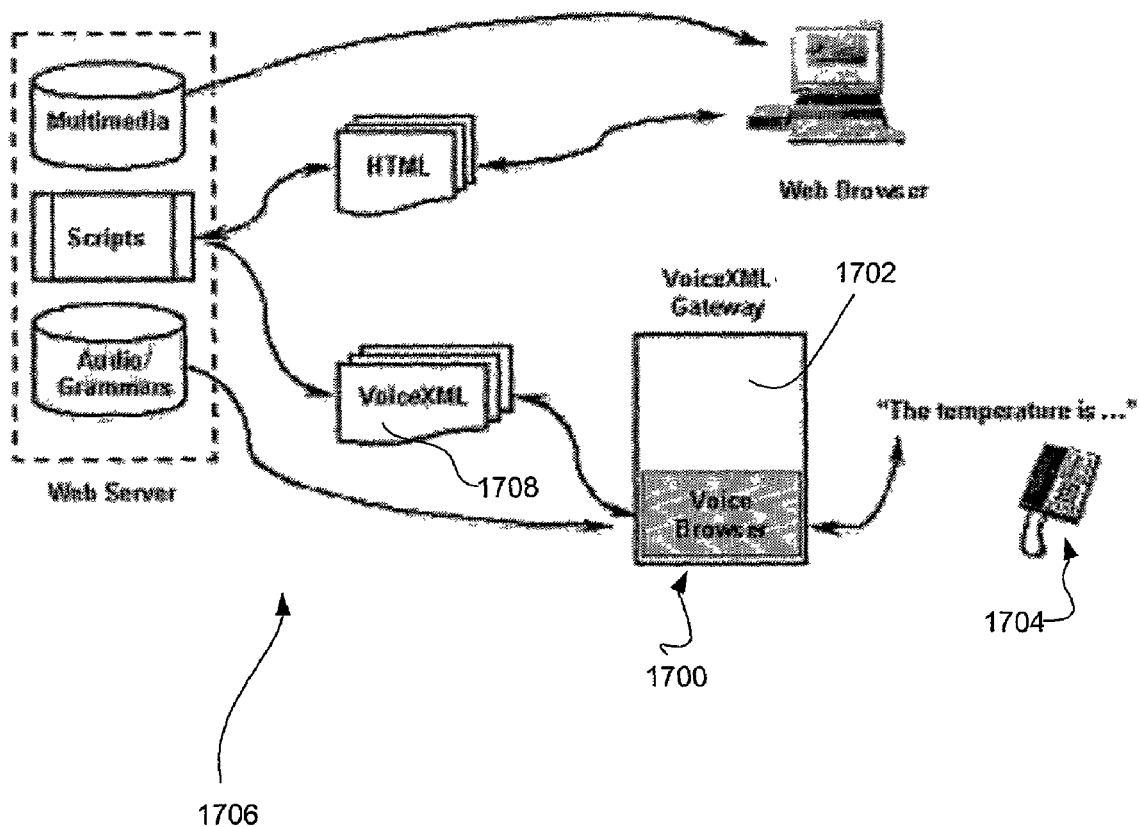
FIG. 17 is a schematic illustrating the manner in which VoiceXML functions, in accordance with one embodiment of the present invention.

FIG. 17 is a schematic illustrating the manner in which VoiceXML functions, in accordance with one embodiment of the present invention. A typical VoiceXML voice browser 1700 of today runs on a specialized voice gateway node 1702 that is connected both to the public switched telephone network 1704 and to the Internet 1706. As shown, VoiceXML 1708 acts as an interface between the voice gateway node 1702 and the Internet 1706.

VoiceXML takes advantage of several trends:

The growth of the World-Wide Web and of its capabilities.

Improvements in computer-based speech recognition and text-to-speech synthesis.

The spread of the WWW beyond the desktop computer.

Voice application development is easier because VoiceXML is a high-level, domain-specific markup language, and because voice applications can now be constructed with plentiful, inexpensive, and powerful web application development tools.

VoiceXML is based on XML. XML is a general and highly flexible representation of any type of data, and various transformation technologies make it easy to map one XML structure to another, or to map XML into other data formats.

VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure in the following manner:

<element_name attribute_name="attribute_value">
. . . contained items . . .
</element_name>

A VoiceXML application consists of one or more text files called documents. These document files are denoted by a ".vxml" file extension and contain the various VoiceXML instructions for the application. It is recommended that the first instruction in any document to be seen by the interpreter be the XML version tag:

<?xml version="1.0"?>

The remainder of the document's instructions should be enclosed by the vxml tag with the version attribute set equal to the version of VoiceXML being used ("1.0" in the present case) as follows:

<vxml version="1.0"1>

Inside of the <vxml>tag, a document is broken up into discrete dialog elements called forms.

Each form has a name and is responsible for executing some portion of the dialog. For example, you may have a form called "mainMenu" that prompts the caller to make a selection from a list of options and then recognizes the response.

A form is denoted by the use of the <form> tag and can be specified by the inclusion of the id attribute to specify the form's name. This is useful if the form is to be referenced at some other point in the application or by another application. For example, <form id="welcome" >would indicate in a VoiceXML document the beginning of the "welcome" form.

Following is a list of form items available in one specification of VoiceXML:

--- field items:

<field>—gathers input from the user via speech or DTMF recognition as defined by a grammar
<record>—records an audio clip from the user
<transfer>—transfers the user to another phone number
<object>—invokes a platform-specific object that may gather user input, returning the result as an ECMAScript object
<subdialog>—performs a call to another dialog or document(similar to a function call), returning the result as an ECMAScript object
control items:

<block>—encloses a sequence of statements for prompting and computation
<initial>—controls mixed-initiative interactions within a form

---

An embodiment of the present invention may also be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subdlassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners Lee, D. Connoly, "RFC 1866: Hypertext Markup Language —2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystems's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta."ActiveX Technologies also includes ActiveX Server Framework, allowing developers to create server applications. One of ordinary skill in the art readily recognizes that ActiveX could be substituted for JAVA without undue experimentation to practice the invention.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless"because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX)is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII.). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

SMS (Short Message Service) is a service for sending messages of up to 160 characters to mobile phones that use Global System for Mobile (GSM) communication. GSM and SMS service is primarily available in Europe. SMS is similar to paging. However, SMS messages do not require the mobile phone to be active and within range and will be held for a number of days until the phone is active and within range. SMS messages are transmitted within the same cell or to anyone with roaming service capability. They can also be sent to digital phones from a Web site equipped with PC Link or from one digital phone to another.

On the public switched telephone network (PSTN), Signaling System 7 (SS7) is a system that puts the information required to set up and manage telephone calls in a separate network rather than within the same network that the telephone call is made on. Signaling information is in the form of digital packet. SS7 uses what is called out of band signaling, meaning that signaling (control) information travels on a separate, dedicated 56 or 64 Kbps channel rather than within the same channel as the telephone call. Historically, the signaling for a telephone call has used the same voice circuit that the telephone call traveled on (this is known as in band signaling). Using SS7, telephone calls can be set up more efficiently and with greater security. Special services such as call forwarding and wireless roaming service are easier to add and manage. SS7 is now an international telecommunications standard.

Speech or voice recognition is the ability of a machine or program to recognize and carry out voice commands or take dictation. In general, speech recognition involves the ability to match a voice pattern against a provided or acquired vocabulary. Usually, a limited vocabulary is provided with a product and the user can record additional words. More sophisticated software has the ability to accept natural speech (meaning speech as we usually speak it rather than carefully-spoken speech).

A tag is a generic term for a language element descriptor. The set of tags for a document or other unit of information is sometimes referred to as markup, a term that dates to pre-computer days when writers and copy editors marked up document elements with copy editing symbols or shorthand.

An Internet search engine typically has three parts: 1) a spider (also called a "crawler" or a "bot") that goes to every page or representative pages on every Web site that wants to be searchable and reads it, using hypertext links on each page to discover and read a site's other pages; 2) a program that creates a huge index (sometimes called a "catalog") from the pages that have been read; and 3) a program that receives your search request, compares it to the entries in the index, and returns results to you.

An alternative to using a search engine is to explore a structured directory of topics. Yahoo, which also lets you use its search engine, is a widely-used directory on the Web. A number of Web portal sites offer both the search engine and directory approaches to finding information.

Different Search Engine Approaches—Major search engines such as Yahoo, AltaVista, Lycos, and Google index the content of a large portion of the Web and provide results that can run for pages—and consequently overwhelm the user. Specialized content search engines are selective about what part of the Web is crawled and indexed. For example, TechTarget sites for products such as the AS/400 (http://www.search400.com) and Windows NT (http://www.searchnt.com) selectively index only the best sites about these products and provide a shorter but more focused list of results. Ask Jeeves (http://www.askjeeves.com) provides a general search of the Web but allows you to enter a search request in natural language, such as "What's the weather in Seattle today?" Special tools such as WebFerret (from http:H/www.softferret.com) let you use a number of search engines at the same time and compile results for you in a single list. Individual Web sites, especially larger corporate sites, may use a search engine to index and retrieve the content of just their own site. Some of the major search engine companies license or sell their search engines for use on individual sites.

Major search engines on the Web include: AltaVista (http://www.altavista.com), Excite (http://www.excite.com), Google (http://www.google.com), Hotbot (http://www.hotbot.com), Infoseek (http://www.infoseek.com), Lycos (http://www.lycos.com), and WebCrawler (http://www.webcrawler.com). Most if not all of the major search engines attempt to index a representative portion of the entire content of the World Wide Web, using various criteria for determining which are the most important sites to crawl and index. Most search engines also accept submissions from Web site owners. Once a site's pages have been indexed, the search engine will return periodically to the site to update the index. Some search engines give special weighting to: words in the title, in subject descriptions and keywords listed in HTML META tags, to the first words on a page, and to the frequent recurrence (up to a limit) of a word on a page. Because each of the search engines uses a somewhat different indexing and retrieval scheme (which is likely to be treated as proprietary information) and because each search engine can change its scheme at any time, we haven't tried to describe these here.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for determining an address of an entity based on a user location, comprising:
   determining a location associated with a user;
   receiving input associated with an entity from the user;
   performing a query to identify a plurality of locations of the entity;
   ascertaining which of the identified locations of the entity are in proximity to the location associated with the user;
   determining which of the identified locations of the entity is closest to the location associated with the user; and
   facilitating communication between the user and at least one of the locations of the entity ascertained to be in proximity to the location associated with the user;
   wherein the user is informed about the locations of the entity ascertained to be in proximity to the location associated with the user;
   wherein the user is informed audibly via a speech recognition portal about the locations of the entity ascertained to be in proximity to the location of the user;
   wherein the user is informed of at least one address associated with at least one of the locations of the entity ascertained to be in proximity to the location associated with the user;
   wherein the user is permitted to select the location associated with the user from a set of locations associated with the users;
   wherein the input associated with the entity includes input representative of criteria of the user, and wherein the locations of the entity ascertained to be in proximity to the location associated with the user satisfy the criteria of the user.

2. The method as recited in claim 1, further comprising receiving an utterance representative of the entity from the user.

3. The nicthod as recited in claim 2, further comprising recognizing the entity associated with the utterance using a speech recognition process.

4. The method as recited in claim 1, wherein the speech recognition portal utilizes a network.

5. The method of claim 1, wherein the location of the user is the current location of the user.

6. The method as recited in claim 1, wherein an origin address is determined utilizing at least one of speech recognition and a global positioning system.

7. The method of claim 1, wherein the criteria of the user include at least one of: a location of the entity currently holding a sale and a currently open location of the entity.

8. The method of claim 1, wherein directions from the location associated with the user to at least one of the identified locations of the entity ascertained to be in proximity to the location of the user are generated and delivered to the user.

9. The method of claim 1, further comprising ranking the identified locations of the entity ascertained to be in proximity to the location associated with the user from closest to furthest from the location associated with the user.

10. The method of claim 1, further comprising offering promotions to the user.

11. The method of claim 10, wherein the promotions offered to the user are associated with one or more entities determined to be proximal to the location of the user.

12. The method as recited in claim 1, wherein the entity is a destination name.

13. The method as recited in claim 12, wherein the destination name includes a category.

14. The method as recited in claim 12, wherein the destination name includes a brand name.

15. The method as recited in claim 12, wherein a destination address is identified based on the destination name utilizing a database that includes addresses associated with at least one of business names, brand names, and goods and services.

16. The method as recited in claim 15, wherein the database includes a categorization of the destination names.

17. A system including a computer program product embodied on a computer readable medium for determining an address of an entity based on a user location, comprising:
 logic for determining a location associated with a user;
 logic for receiving input associated with an entity from the user;
 logic for performing a query to identify a plurality of locations of the entity;
 logic for ascertaining which of the identified locations of the entity are in proximity to the location associated with the user;
 logic for determining which of the identified locations of the entity is closest to the location associated with the user; and
 logic for facilitating communication between the user and at least one of the locations of the entity ascertained to be in proximity to the location associated with the user:
 wherein the user is informed about the locations of the entity ascertained to be in proximity to the location associated with the user;
 wherein the user is informed audibly via a speech recognition portal about the locations of the entity ascertained to be in proximity to the location of the user;
 wherein the user is informed of at least one address associated with at least one of the locations of the entity ascertained to be in proximity to the location associated with the user;
 wherein the user is permitted to select the location associated with the user from a set of locations associated with the user;
 wherein the input associated with the entity includes input representative of criteria of the user, and wherein the locations of the entity ascertained to be in proximity to the location associated with the user satisfy the criteria of the user.

18. A computer program product embodied on a computer readable medium for determining an address of an entity based on a user location, comprising:
 computer code for detennining a location associated with a user;
 computer code for receiving input associated with an entity from the user;
 computer code for performing a query to identify a plurality of locations of the entity;
 computer code for ascertaining which of the identified locations of the entity are in proximity to the location associated with the user;
 computer code for determining which of the identified locations of the entity is closest to the location associated with the user; and
 computer code foy facilitating communication between the user and at least one of the locations of the entity ascertained to be in proximity to the location associated with the user;
 wherein the user is informed about the locations of the entity ascertained to be in proximity to the location associated with the user;
 wherein the user is informed audibly via a speech recognition portal about the locations of the entity ascertained to be in proximity to the location of the user;
 wherein the user is informed of at least one address associated with at least one of the locations of the entity ascertained to be in proximity to the location associated with the user;
 wherein the user is permitted to select the location associated with the user from a set of locations associated with the user;
 wherein the input associated with the entity includes input representative of criteria of the user, and wherein the locations of the entity ascertained to be in proximity to the location associated with the user satisfy the criteria of the user.

* * * * *